(12) United States Patent
Puder et al.

(10) Patent No.: US 11,221,975 B2
(45) Date of Patent: Jan. 11, 2022

(54) MANAGEMENT OF SHARED RESOURCES IN A SOFTWARE-DEFINED STORAGE ENVIRONMENT

(71) Applicant: EMC IP Holding Company LLC, Hopkinton, MA (US)

(72) Inventors: Avi Puder, Zichron Yakov (IL); Itay Keller, Tel Aviv (IL); Galina Tcharny, Haifa (IL); Dvir Koren, Nahalal (IL); Jonathan Sahar, Haifa (IL); Benjamin Grimberg, Haifa (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 99 days.

(21) Appl. No.: 16/807,709

(22) Filed: Mar. 3, 2020

(65) Prior Publication Data

US 2021/0279187 A1    Sep. 9, 2021

(51) Int. Cl.
  *G06F 3/00* (2006.01)
  *G06F 13/16* (2006.01)
  *G06F 9/50* (2006.01)

(52) U.S. Cl.
  CPC ........ *G06F 13/1668* (2013.01); *G06F 9/5055* (2013.01)

(58) Field of Classification Search
  CPC ..... G06F 13/00; G06F 13/1668; G06F 9/5055
  See application file for complete search history.

(56) References Cited

U.S. PATENT DOCUMENTS

| 2007/0101033 | A1* | 5/2007 | Chen | G06F 13/362 |
| | | | | 710/241 |
| 2008/0155100 | A1* | 6/2008 | Ahmed | G06F 9/5027 |
| | | | | 709/226 |
| 2014/0082318 | A1* | 3/2014 | Benhase | G06F 3/0611 |
| | | | | 711/171 |
| 2018/0113640 | A1 | 4/2018 | Fernandez et al. | |
| 2018/0300075 | A1 | 10/2018 | Fernandez et al. | |
| 2019/0227845 | A1 | 7/2019 | Sridhar et al. | |
| 2020/0366682 | A1* | 11/2020 | Aggarwal | H04L 47/805 |

OTHER PUBLICATIONS

G. Soundararajan et al., "Dynamic Resource Allocation for Database Servers Running on Virtual Storage," FAST 2009: Proceedings of the 7th conference on File and storage technologies, Feb. 2009, pp. 71-84.

* cited by examiner

*Primary Examiner* — Henry Tsai
*Assistant Examiner* — Kim T Huynh
(74) *Attorney, Agent, or Firm* — Ryan, Mason & Lewis, LLP

(57) ABSTRACT

A storage control system receives an I/O request from a client for accessing storage resources that are logically divided into device groups, and determines a resource token request value associated with the I/O request and a target device group to which the I/O request is directed. The storage control system determines a number of allowed resource tokens to allocate to the client as a function of (i) the resource token request value, (ii) a sum total of resource tokens requested by other clients for accessing the target device group, and (iii) a total amount of resource tokens currently allocated to the target device group to which the I/O request is directed. The storage control system sends the determined number of allowed resource tokens to the client to thereby enable the client to limit a number of inflight I/O requests that the client issues to the storage control system.

20 Claims, 4 Drawing Sheets

MANAGEMENT OF SHARED RESOURCES IN A SOFTWARE-DEFINED STORAGE ENVIRONMENT

FIELD

This disclosure relates generally to techniques for managing the usage of shared resources by clients in a storage environment.

BACKGROUND

A software-defined storage (SDS) system is a storage architecture that separates storage control software from the underlying storage hardware which is managed by the storage control software. The SDS system allows different types of storage devices and storage platforms to be network connected, pooled, and managed by the SDS storage control software. For example, various types of data storage devices and platforms such as disk storage, flash storage, object storage, file storage, block storage, cloud-based storage resources, etc., can be joined to build a storage infrastructure wherein the storage capacity can be virtually pooled, divided into volumes, and managed under control the SDS storage control software. The SDS system is deployed between application hosts and the physical storage devices that are managed by the SDS system, and the SDS system responds to input/output (I/O) requests from client applications that execute on the application hosts to store/retrieve data to/from the underlying storage as requested.

In an SDS system, on the server/storage side, different groups of storage devices and device aggregators may share various system wide I/O and storage-related resources, such as memory, threads, network buffers, etc., which are needed to execute the I/O operations that are associated with inflight I/O requests. The inflight I/O requests that are destined for different groups of storage devices are competing for these shared resources, which are limited by nature. The different groups of storage devices (e.g., groups of hard disk drives (HDDs), groups of solid-state drives (SSDs), etc.) that are managed by the SDS system will have different storage performances and capabilities in terms of, e.g., I/O operations per second (IOPS), average I/O latency, etc. The differences in storage performances can lead to interference between different groups of storage devices due to, e.g., the starvation of shared I/O and storage-related resources to higher performance storage device groups (e.g., SSD device groups) as a result of such shared resources being held for a longer time span to process inflight I/O requests destined for lower performance storage device groups (e.g., HDD device groups).

SUMMARY

Exemplary embodiments of the disclosure include methods for implementing a token-based resource allocation scheme for managing shared resources (e.g., inflight I/O-related resources, throughput storage-related resources, etc.) among a plurality of client applications in a software-defined storage system. For example, one exemplary embodiment is implemented by a storage control system (e.g., an SDS system). The storage control system receives an I/O request from a client application for accessing data storage resources controlled by the storage control system, wherein the data storage resources comprise storage devices which are logically divided by the storage control system into a plurality of device groups. The storage control system determines a resource token request value associated with the I/O request and a target device group to which the I/O request is directed. The storage control system determines a number of allowed resource tokens to allocate to the client application, wherein the number of allowed resource tokens is determined as a function of (i) the resource token request value, (ii) a sum total of resource tokens requested by other client applications for accessing the target device group, and (iii) a total amount of resource tokens currently allocated to the target device group to which the I/O request is directed. The storage control system sends the client application the determined number of allowed resource tokens allocated to the client application to thereby enable the client application to limit a number of inflight I/O requests that the client application issues to the storage control system based on the number of allowed resource tokens allocated to the client application for accessing the target device group.

Other embodiments of the disclosure include, without limitation, computing systems and articles of manufacture comprising processor-readable storage media for implementing a token-based resource allocation scheme for managing shared resources among a plurality of client applications in a data storage application.

DETAILED DESCRIPTION

Figure 1:
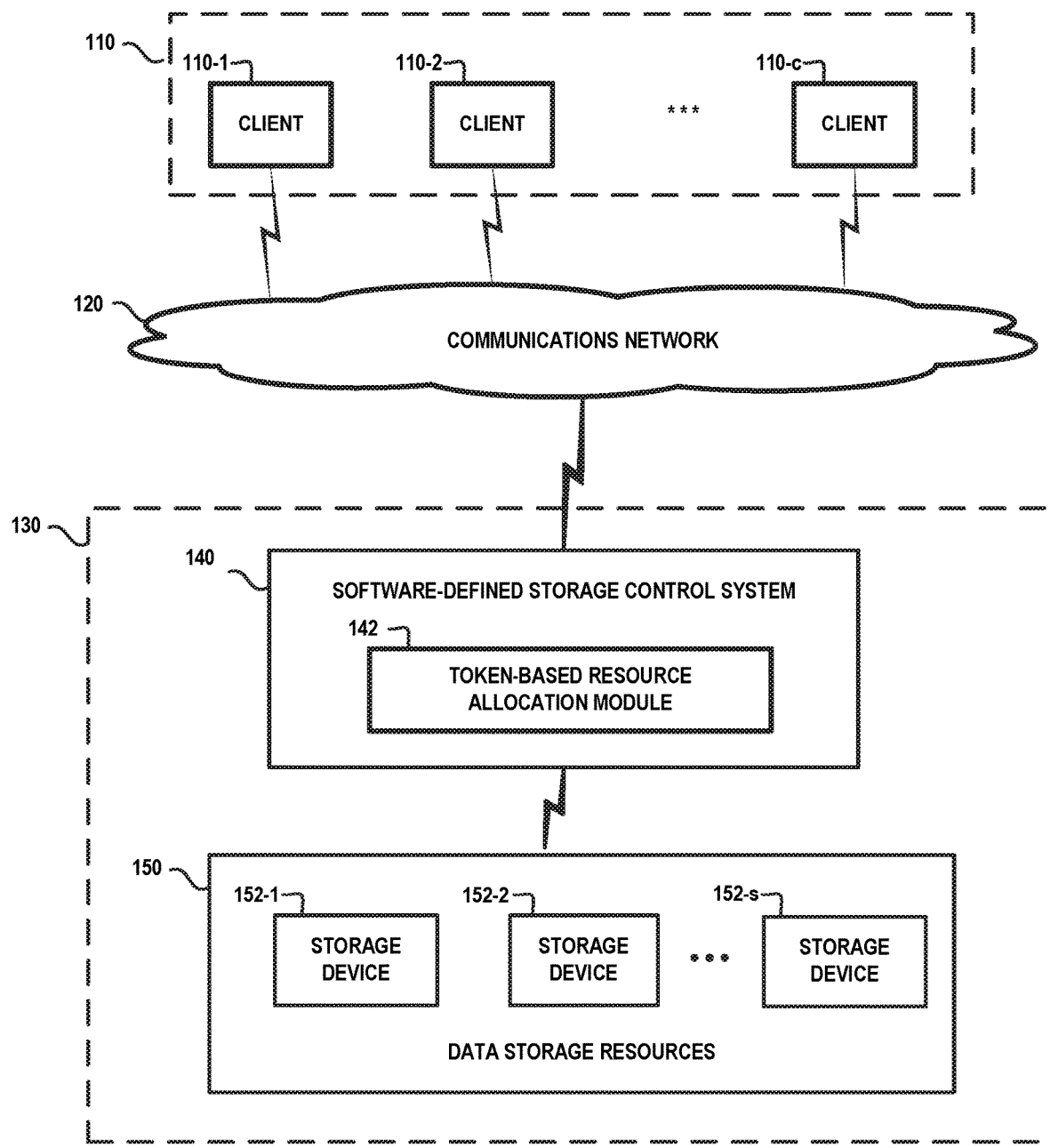
FIG. 1 is a high-level schematic illustration of a computing system comprising a software-defined storage control system that implements a token-based resource allocation process for managing the sharing of resources among a plurality of clients in a software-defined storage environment, according to an exemplary embodiment of the disclosure.

Exemplary embodiments of the disclosure will now be described in detail with regard to systems and methods for implementing a token-based resource allocation scheme for managing shared resources (e.g., inflight I/O-related resources, throughput storage-related resources, etc.) among a plurality of client applications in a software-defined storage environment. For example, FIG. 1 is a high-level schematic illustration of a computing system comprising a software-defined storage control system that implements a token-based resource allocation process for managing the sharing of resources among a plurality of clients in a software-defined storage environment, according to an exemplary embodiment of the disclosure. More specifically, FIG. 1 schematically illustrates a computing system 100 which comprises a plurality of client applications 110-1, 110-2, . . . , 110-c (collectively referred to as client applications 110), a communications network 120, and a server node 130. The server node 130 comprises a software-defined storage (SDS) control system 140 and data storage resources

150. The SDS control system 140 comprises a token-based resource allocation module 142. The data storage resources 150 comprise a plurality of storage devices 152-1, 152-2, . . . , 152-s (collectively referred to as storage devices 152).

The client applications 110 include various types of applications that issue data I/O requests to access and store data to and from the data storage devices 152 of the local storage resources 150 of the server node 130. For example, the client applications 110 include user applications, server applications, database applications, virtual machines, containers, etc. The client applications 110 can be hosted by, and execute on, various types of computing devices and systems including, but not limited to, desktop computers, laptop computers, workstations, computer servers, enterprise servers, rack servers, smart phones, electronic tablets, etc.

While the communications network 120 is generically depicted in FIG. 1, it is to be understood that the communications network 120 may comprise any known communication network such as, a global computer network (e.g., the Internet), a wide area network (WAN), a local area network (LAN), an intranet, a satellite network, a telephone or cable network, a cellular network, a wireless network such as Wi-Fi or WiMAX, a storage fabric (e.g., Ethernet storage network), or various portions or combinations of these and other types of networks. The term "network" as used herein is therefore intended to be broadly construed so as to encompass a wide variety of different network arrangements, including combinations of multiple networks possibly of different types, which enable communication using, e.g., Internet Protocol (IP) or other communication protocols such as Fibre Channel data transfer protocol, an iSCSI (Internet Small Computer Systems Interface) data transfer protocol, etc., to support storage network connectivity, etc.

In some embodiments, the storage resources 150 comprise direct-attached storage (DAS) resources (internal and/or external storage resources of the server node 130), wherein the storage devices 152 are virtually pooled into shared block storage by the SDS control system 140. For example, the storage devices 152 include the same type, or a combination of different types of persistent storage devices (e.g., physical block devices) such as hard disk drives (HDDs), solid-state drives (SSDs) (e.g., flash storage devices), PCIe flash cards, or other types and combinations of non-volatile memory. The data storage resources 150 are directly connected to the server node 130 through, e.g., a host bus adapter, and using suitable protocols such as ATA, SATA, eSATA, NVMe, SCSI, SAS, etc. In an exemplary embodiment, the storage devices 152 include both HDD and SSD storage devices. As is known in the art, SSD storage devices provide faster storage performance than HDD devices.

The SDS control system 140 is a component of the software-defined storage environment shown in FIG. 1. In some embodiments, the software-defined storage environment comprises other components such as SDS data clients and SDS metadata managers, which are not specifically shown in FIG. 1. The SDS control system 140 comprises a software layer that is deployed on the server node 130 and configured to provision, orchestrate and manage the physical data storage resources 150 of the server node 130. For example, the SDS control system 140 implements methods that are configured to create and manage storage pools by aggregating capacity from the physical storage devices 152 (e.g., virtual pools of block storage). The SDS control system 140 can divide a storage pool into one or more volumes, wherein the volumes are exposed to client applications 110 as block devices.

The SDS control system 140 supports the virtualization of storage by separating the control and management software from the hardware architecture. The SDS control system 140 is configured to abstract storage access services from the underlying storage hardware to thereby control and manage I/O requests issued by the client applications 110, as well as support networking and connectivity. As shown in FIG. 1, the SDS control system 140 is deployed in the data path between the client applications 110 and the physical data storage resources 150 of the server node 130, and is configured to respond to data I/O requests from the client applications 110 by accessing the storage resources 150 to store/retrieve data to/from the storage devices 152 based on the I/O requests.

On the client-side, an SDS data client (SDC) is a lightweight device driver that is deployed in each host application server which hosts one or more of the client applications 110 that require access to the block devices exposed and managed by the SDS control system 140. The SDC exposes block devices representing the virtual storage volumes that are currently mapped to that host. In particular, the SDC serves as a block driver for a client (server) to access the block storage that is managed by the SDS control system 140. The SDC provides the operating system or hypervisor (which runs the SDC) access to the logical block devices (e.g., volumes). The SDCs have knowledge of which SDS control systems (e.g., SDS control system 140) hold its block data, so multipathing can be accomplished natively through the SDCs. The metadata managers manage SDC to SDS data mapping.

While FIG. 1 generally depicts the software-defined storage environment having a single server node 130 for ease of illustration and discussion, it is to be understood that in other embodiments, the system 100 of FIG. 1 can implement a server cluster of two or more server nodes (e.g., hundreds of server nodes), wherein each server node deploys its own SDS control system. In this instance, the SDS control system of each server node converts the local storage resources (e.g., DAS resources) of the server node into block storage and contributes the block storage to the server cluster to implement a server-based storage area network (SAN) (e.g., virtual SAN), wherein each server node is part of a loosely coupled server cluster which enables "scale-out" of the software-defined storage environment.

In the software-defined storage environment of FIG. 1, for purposes of discussion, the term "node" or "server node" as used herein refers to a single server node (e.g., server node 130) which comprises physical block devices (e.g., HDD devices, SSD devices, etc.). The SDS control system 140 of the server node 130 exposes abstractions of block devices (e.g., virtual block devices). For example, a virtual block device can correspond to a volume of a storage pool. Each virtual block device comprises any number of actual physical storage devices, which are referred to herein as "device groups." For illustrative purposes, it is assumed that each "device group" is homogenous in terms of the type of storage devices within the group (e.g., a device group can include only HDD devices or SSD devices, etc.). In addition, different device groups can have the same type of storage device, but a different number of storage devices. For example, a first device group can include 10 HDDs, a second device group can include 100 HDDs, a third device group can include 50 SSDs, and a fourth group can include 100 SSDs, etc.

In general, a software-defined storage system has certain characteristics which provide the impetus for implementing the token-based resource allocation module 142, the functions of which will explained in further detail below. For example, in a software-defined storage system, each client I/O request requires the allocation of certain resources for the duration of the associated I/O operation. In particular, the execution of an I/O operation requires the allocation of various types of I/O-related and storage-related resources such as threads, buffer storage, etc. In addition, multiple I/O requests from the same client and/or different clients are served concurrently/simultaneously, wherein such concurrent I/O requests utilize portions of the shared resources (such as memory, threads, network buffers etc.). Further, different "device groups" may have different capacities to perform concurrent I/O operations either because of the turnaround time (e.g., average I/O latency) of the types of storage devices that make up the different device groups and/or because of varying amounts of storage devices within the different device groups. This results in differences in the average I/O latency and throughput for different device groups. Moreover, client I/O requests are typically received in a pipe-like fashion in the sense that the SDS control system has no foreknowledge of the destination of incoming I/O requests, i.e., no knowledge of which device groups are the targets of the I/O requests.

For illustrative purposes, assume there are multiple device groups including a first device group comprising SSD devices and a second device group comprising HDD devices. In this example, the first device group provides lower I/O latency for accessing the SSD devices as compared to the higher I/O latency of the second device group for accessing the HDD devices. When the SDS control system 140 receives I/O requests at a given socket, the I/O requests are stored in an I/O queue. Assume that the received I/O requests include requests for accessing SSD and HDD storage resources. Each queued I/O is then allocated to a receive buffer for execution until all available buffers are allocated. At a given point in time, all available buffers will have been allocated to I/O requests for execution by HDD and SSD devices. However, due to the longer turnaround time (higher latency) associated with the second device group (HDD devices), the resources that are utilized for the I/O requests destined for the second (slower) device group may be held for a longer time span than the I/O requests destined for the first (faster) device group of SSD devices. As such, the buffers that are allocated to temporarily store data associated with pending inflight I/O requests destined for the first group of SSD devices are cleared and made available faster than the buffers that are allocated to temporarily store data associated with pending inflight I/O requests destined for the second (slower) group of HDD devices.

Over time, if new incoming I/O requests are spread between the first and second device groups, most or all of the shared resources will eventually be allocated for executing pending I/O requests for the second device group of HDD devices. This means that the I/O requests destined for the first device group of SSD devices will only be served once the I/O requests destined for the second device group of HDD devices have been served, which effectively throttles the rate at which the first device group of SSD devices performs. A naïve solution to preventing this starvation problem is to statically split the shared resources between the first and second device groups to prevent starvation of resource allocation for the execution of I/O requests for the first device group of SSD devices. However, this naïve solution does not efficiently or optimally utilize the entirety of the available resources based on the actual workloads associated with the I/O requests.

The token-based resource allocation module 142 implements methods to enable shared resource management and optimization of resource allocation in a software-defined storage environment with resources (e.g., I/O-related resources, storage-related resources, etc.) that are shared by multiple clients. The token-based resource allocation module 142 is configured to dynamically control and manage the flow of incoming I/O requests using a token-based scheme which allocates tokens that are associated with shared resources to the client applications to ensure that the overall number of concurrent I/O requests does not exceed the capacity of the shared resources, thus preventing a shared resource from becoming a bottleneck. For example, in some embodiments, a token-based mechanism is implemented using resource tokens such as I/O tokens and throughput tokens. The I/O tokens are utilized to manage the allocation of inflight I/O resources, e.g., threads. In some embodiments, a single I/O token allows one inflight I/O. The throughput tokens are utilized to manage the allocation of storage-related resources such as buffers and disks. In some embodiments, a single throughput token corresponds to a predefined amount of data (e.g., a single throughput token allows 1 Mbyte of data).

As explained in further detail below, the token-based resource allocation module 142 manages the load that is allocated to each device group (e.g., HDD device group, SSD device group, etc.) based on a budget of resource tokens that is derived from a measure of the ability of the device group to perform concurrent I/O operations. The token-based resource allocation module 142 periodically distributes/divides the device group tokens between the clients of the device groups (i.e., those clients of the system which have I/O requests directed to the devices of the group). This distribution/division is performed in a dynamic, changing fashion, such that clients which have a greater load/need at a given moment are allocated more resource tokens than other clients which are "quieter" at the same time. The functionalities of the token-based resource allocation module 142 will now be discussed in further detail in conjunction with FIG. 2.

Figure 2:
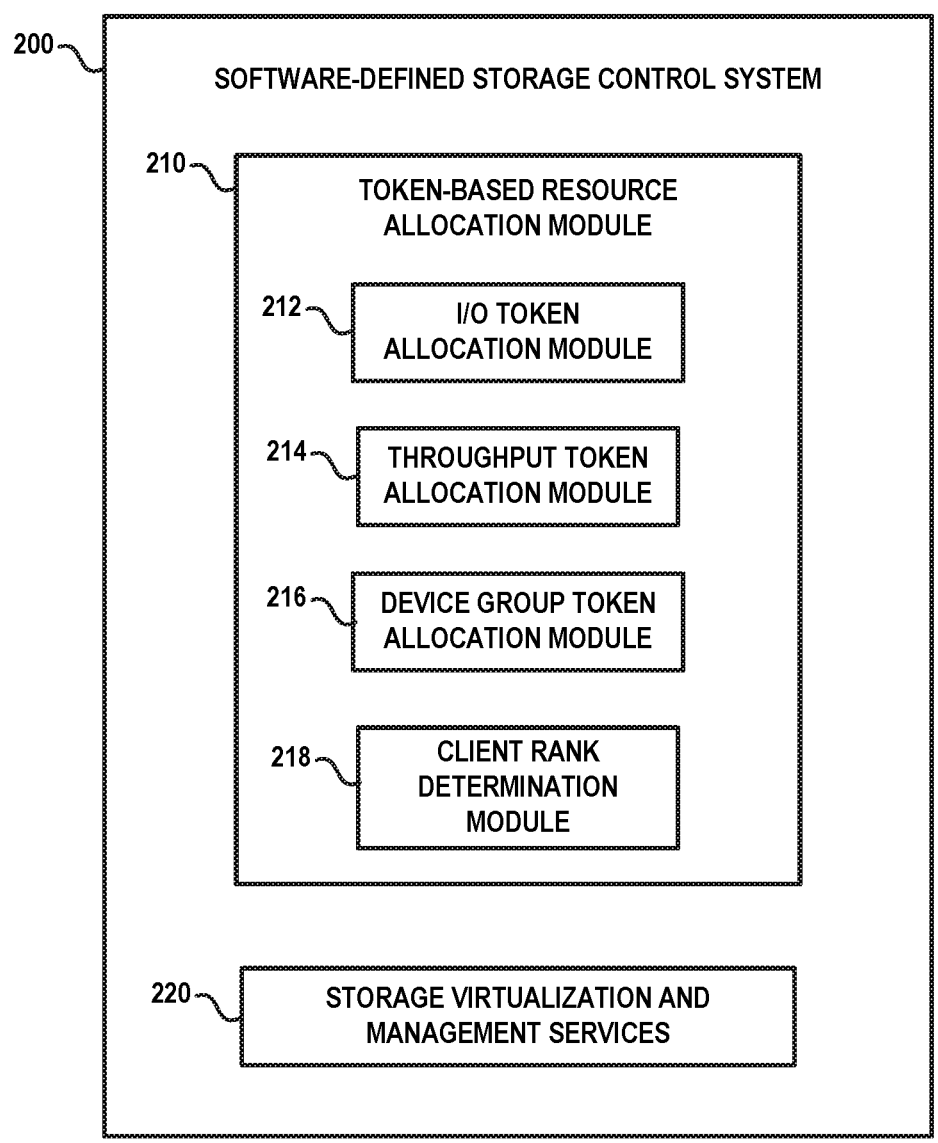
FIG. 2 schematically illustrates a software-defined storage control system, according to an exemplary embodiment of the disclosure.

FIG. 2 schematically illustrates an SDS control system 200, according to an exemplary embodiment of the disclosure. In some embodiments, FIG. 2 illustrates an exemplary framework of the SDS control system 140 of FIG. 1. The SDS control system 200 comprises a token-based resource allocation module 210 and storage virtualization and management services 220. The token-based resource allocation module 210 comprises an I/O token allocation module 212, a throughput token allocation module 214, a device group token allocation module 216, and a client rank determination module 218.

The storage virtualization and management services 220 implement various services that are commonly provided by a software-defined storage system to provide policy-based provisioning and management of data storage independent of the underlying storage hardware. For example, the storage virtualization and management services 220 implement methods for virtualizing and managing physical storage resources of a server node. In some embodiments, the storage virtualization and management services 220 implement methods to consolidate storage devices into one or more virtual pools that are thin-provisioned for maximum capacity. Each virtual pool is logically divided into one or more volumes (e.g., virtual disks), wherein the volumes are presented to hosts as block devices (e.g., raw logical unit numbers (LUNs)) to store data. Furthermore, in some embodiments, the storage virtualization and management services 220 implement methods to provide various data storage services such as data protection, data migration, data deduplication, replication, thin provisioning, snapshots, etc.

The token-based resource allocation module 210 allocates resource tokens (e.g., I/O tokens, throughput tokens, etc.) to the client applications to dynamically control and manage the flow of incoming I/O requests from the client applications and to manage the allocation of shared I/O-related resources and storage-related resource among the client applications issuing the I/O requests to the storage resources managed by the SDS controls system 200. In general, the I/O token allocation module 212 implements methods that are configured to allocate I/O tokens to the client applications to manage and control the allocation of inflight I/O-related resources (e.g., threads) that are shared among the client applications issuing I/O requests for data access operations. The throughput token allocation module 214 implements methods that are configured to allocate throughput tokens to the client applications to manage and control the allocation of storage-related resources (e.g., buffers, disks, etc.) that are shared among the client applications that issue I/O requests for data access operations.

The device group token allocation module 216 implements methods that are configured to allocate a set of device group tokens to each device group. As explained in further detail below, the device group tokens for a given device group (referred to as a "budget of resource tokens") include, for example, a specified amount of I/O tokens and throughput tokens which are allocated to the given device group based on, e.g., the resource needs of the device groups, the current workload, etc.

The client rank determination module 218 implements methods that are configured to determine and update rank values for the client applications. As explained in further detail below, the client rank values are utilized to automatically adjust resource token request values that are received from the client applications. The adjustment of resource token request values serves to prevent client applications with backlogged I/O requests from issuing I/O requests with increased resource token request values and thereby unduly monopolize the I/O-related and/or throughput-related resources to the detriment of other client applications.

In a software-defined storage environment such as shown in FIG. 1, the SDS control system 200 receives I/O requests from multiple client applications. The I/O requests include standard information and data including, but not limited to, the type of I/O (e.g., read, write, etc.), the target device group (e.g., target block device), the storage location/address, the data to be stored, etc. In addition, the SDS control system 200 responds to each I/O request with an I/O response message, e.g., an acknowledgment of a successful I/O operation, a notification of an I/O error or fault associated with the I/O request, etc.

It is to be noted that the term "inflight I/O request" as used herein refers to an I/O request which has been sent by a client application to the SDS control system, and for which the client application has not yet received an I/O response message from the SDS control system. In this regard, the duration of an inflight I/O request is a period of time between the time when an I/O request is sent by a client application and the time when the client application receives an I/O response message that is associated with the I/O request.

In accordance with the exemplary embodiments of storage-defined storage environments as described herein, when a client application sends an I/O request to the SDS control system 200 which is destined for a target device group, in addition to standard information contained in the I/O request, the I/O request will further include at least one "resource token request value" appended to the I/O request. For example, the resource token request value can be an "I/O token request value" or "a throughput token request value" or both types of resource token request values. The I/O token request value represents the total number of inflight I/O requests that the client application would like to send to the target device group in the near future and possibly have concurrently pending for the target device group at a given time, assuming unlimited bandwidth. In particular, the I/O token request value includes all current inflight I/O requests of the client, and the accumulated I/O requests on the client side which are destined for the target device group and which have not yet been sent to the SDS control system. The throughput token request value represents a total amount of data that is associated with all of the I/O requests corresponding to the I/O token request value.

Furthermore, in accordance with the exemplary embodiments of storage-defined storage environments as described herein, when the SDS control system 200 sends an I/O response message to a client application, in addition to the standard information contained in the I/O response message, the I/O response message will further include at least one "allowed resource tokens value" appended to the I/O response message. For example, the "allowed resource tokens value" may comprise an "allowed I/O tokens value" or an "allowed throughput tokens value" or the I/O response message can include both types of allowed resource token values appended thereto. The appended values of allowed resource tokens denote the allowed number of I/O tokens and allowed number of throughput tokens, which are currently allocated to the given client application to access the target device group for a current "resource allocation cycle."

It is to be noted that the term "resource allocation cycle" as used herein refers to a specified period in which computations (e.g., EQNs. (1), (2), (3) and (4) below) are periodically performed to dynamically determine resource token allocations for (i) the client applications for accessing device groups managed by the SDS control system, and for (ii) the storage device groups based on device group characteristics and relative workload demand of the device groups. For example, in an non-limiting exemplary embodiment, where the SDS control system 200 can serve hundreds of thousands of I/Os per second, a time period associated with a "resource allocation cycle" can be, e.g., every 100 milliseconds.

In some embodiments, one I/O token represents a predefined amount of allowed inflight I/O requests (e.g., one I/O token allows one inflight I/O request), and one throughput token represents a predefined amount of data (e.g., one throughput token allows one Mbyte of data). By way of example, assuming that one I/O token allows one inflight I/O request, an allowed I/O tokens value=50 indicates that the client is allocated a total 50 I/O tokens, which represents a total of 50 inflight I/O requests that the client is allowed to have pending at a given time for a target device group in the current resource allocation cycle. In addition, assuming that one throughput token allows one Mbyte of data, an allowed throughput tokens value=20 indicates that the client is allocated a total of 20 throughput tokens, which represents a total amount of 20 Mbytes of data that the client is allowed at a given time for the client's inflight I/O requests directed to the target device group in the current resource allocation cycle.

The SDS control system 200 obtains the current resource token allocations for a given client from the I/O token allocation module 212 and the throughput token allocation module 214. The I/O token allocation module 212 and the throughput token allocation module 214 periodically compute (for each resource allocation cycle) new I/O token and throughput token allocations for each client application issuing I/O requests to target device groups managed by the SDS control system 200. In this regard, the resource token allocations to a given client for a given device group dynamically change over time depending on various factors.

The allowed number of I/O tokens (as specified by the "allowed I/O tokens value") represents a total number of inflight I/O requests the given client application can concurrently have directed to a target device group at any given time in a current resource allocation cycle until a new/updated allowed I/O tokens value is computed in a next resource allocation cycle and sent to the client application from the SDS control system 200. In particular, the allowed I/O tokens value for a current resource allocation cycle represents a total amount of (i) new I/O requests that client application can send in the current resource allocation cycle plus (ii) currently pending inflight I/O requests. The allowed number of I/O tokens that are allocated to a given client for I/O requests destined for a target device group is determined as a function of (i) the number of I/O tokens requested by the given client application for accessing the target device group, (ii) a sum total of all I/O tokens requested by all client applications for accessing the target device group, and (iii) a total amount of I/O tokens currently allocated to the given device group to which the I/O requests are directed.

More specifically, in some embodiments, the number of allowed I/O tokens that are allocated to a given client application ($client_x$) for a given device group is computed by the I/O token allocation module 212 as follows:

$$\text{Allowed } I/O \text{ Tokens}_{client_x} = \frac{\text{Requested } I/O \text{ Tokens}_{client_x}}{\sum_{i=1}^{C} \text{Requested } I/O \text{ Tokens}_{client_i}} \times \text{Total Group } I/O \text{ Tokens.} \quad \text{EQN. (1)}$$

As shown in EQN. (1), the number of allowed I/O tokens that are allocated to a given client application ($client_x$) for accessing a target device group is computed as a proportion (e.g., ratio) of (i) the number of I/O tokens requested by the given client application ($client_x$) to (ii) the sum total of all I/O tokens requested by all client applications ($client_i$, where i=1, . . . , C) for accessing the target device group, multiplied by a total amount of I/O tokens (denoted by Total Group I/O Tokens) currently allocated to the target device group to which the client I/O requests are directed. The value of the parameter Total Group I/O Tokens for the given device group is determined by the device group token allocation module 216 using exemplary methods (e.g., EQN. (3)) as discussed in further detail below.

The I/O token allocation module 212 routinely distributes the device group I/O tokens between the client applications of a given device group (i.e., the client applications of the system which have I/O requests directed to storage devices of the given device group). The distribution is performed in a dynamic, changing fashion, such that client applications which have a greater load/need for I/O operations at a given moment are allocated more I/O tokens than other client applications which have a lesser load/need for I/O operations at the same given moment. To reduce the compute time and contention associated with I/O token distribution, the computation of EQN. (1) is periodically performed for each resource allocation cycle (e.g., every 100 milliseconds) rather than in response to each I/O request or each I/O operation.

Similarly, the allowed number of throughput tokens (as specified by the "allowed throughput tokens value") represents a maximum amount of data that can be associated with the total amount of allowed I/O requests (e.g., total of new inflight I/O requests and currently pending inflight I/O requests) that are allocated to the given client application for the current resource allocation cycle until a new "allowed throughput tokens value" is computed in a next resource allocation cycle and sent to the client application from the SDS control system 200. The allowed number of throughput tokens that are allocated to a given client for I/O requests destined for a target device group is determined as a function of (i) the number of throughput tokens requested by the given client application for accessing the target device group, (ii) a sum total of all throughput tokens requested by all client applications for accessing the target device group, and (iii) a total amount of throughput tokens currently allocated to the given device group to which the I/O requests are directed.

More specifically, in some embodiments, the number of allowed throughput (TP) tokens that are allocated to a given client application ($client_x$) for a given device group is computed by the throughput token allocation module 214 as follows:

$$\text{Allowed } TP \text{ Tokens}_{client_x} = \frac{\text{Requested } TP \text{ Tokens}_{client_x}}{\sum_{i=1}^{C} \text{Requested } TP \text{ Tokens}_{client_i}} \times \text{Total Group } TP \text{ Tokens.} \quad \text{EQN. (2)}$$

As shown in EQN. (2), the number of allowed throughput tokens that are allocated to a given client application ($client_x$) is computed as a ratio of (i) the number of throughput tokens requested by a given client application ($client_x$) to (ii) the sum total of all throughput tokens requested by all client applications ($client_i$, where i=1, . . . , C), multiplied by a total amount of throughput tokens (denoted by Total Group TP Tokens) currently allocated to the given device group to which the I/O requests are directed. The value of the parameter Total Group TP Tokens for the given device group is determined by the device group token allocation module 216 using exemplary methods (e.g., EQN. (4)) as discussed in further detail below.

The throughput token allocation module 216 routinely distributes the device group throughput tokens between the client applications of a given device group (i.e., the client applications of the system which have I/O requests directed to storage devices of the given device group). The distribution is performed in a dynamic, changing fashion, such that client applications which have a greater load/need for data throughput for their associated I/O operations at a given time are allocated more throughput tokens than other client applications which have a lesser load/need for data throughput for their I/O operations at the given time. To reduce the compute time and contention associated with throughput token distribution, the computation of EQN. (2) is periodically performed for each resource allocation cycle (e.g., every 100 milliseconds) rather than in response to each I/O request or each I/O operation.

In some embodiments, the client application is responsible for enforcing the limitations associated with the allowed number of I/O tokens and allowed number of throughput tokens that are allocated to the client application by the SDS control system 200. In particular, the client application is responsible to avoid issuing I/O requests that exceed the allowed number of I/O tokens. In addition, the client is responsible to avoid issuing I/O requests with associated data that exceeds the allowed number of throughput tokens. In some embodiments, client compliance with the allocated resource tokens is implemented client-side by the SDS client drivers that execute on the client hosts and communicate with the SDS control system. The follow examples illustrate ways in which a client will issue I/O requests in compliance with the allocated resource tokens in a current resource allocation cycle.

For example, assume that for a current resource allocation cycle, a given client application has been allocated 150 I/O tokens for sending inflight I/O requests to a target device group. During the current resource allocation cycle, the SDS control system will append the value of allowed I/O tokens (e.g., 150 I/O tokens) to I/O responses that are sent to the client application. While the number of allowed I/O tokens allocated to the client application can change in a next resource allocation cycle and subsequent resource allocation cycles, the current allowed value of 150 I/O tokens will remain fixed for the current resource allocation cycle. Assume that the client application already has 50 inflight I/O requests that are directed to the target device group. In this instance, the client application can only send an additional 100 I/O requests during the current resource allocation cycle, reaching the maximum allowed number of 150 inflight I/O requests (assuming, of course, that the total data associated with the 150 inflight I/O requests does not exceed an allowed throughput tokes value allocated to the given client for the current resource allocation cycle).

While the client application may have additional I/O requests that are destined for the target device group, the client application cannot send additional I/O requests in the current resource allocation cycle until the client application receives I/O response messages from the SDS control system, wherein each received I/O response message indicates the completion (e.g., success, failure, etc.) of a given inflight I/O request of the client application. In this regard, at any point in time, a difference between (i) the number of inflight I/O requests sent by a given client application for accessing the target device group and (ii) the number of I/O response messages received by the given client application, should not exceed the number of allowed I/O tokens allocated to the given client application for the current resource allocation cycle.

As the client application continues to send I/O requests with updated resource token request values, and receives I/O response message from the SDS control system, at some point in time, an I/O response message will include new/updated values of allowed resource tokens (e.g., allowed I/O token and/or throughput token value) which were computed by the SDS control system in a next resource allocation cycle. As the client application receives updated values for allocated resource tokens, the client application will continue to issue new I/O requests in compliance with the updated allowed numbers of resource tokens allocated to the client application for the target device group.

By way of further example, assume that for a current resource allocation cycle, a given client application has requested 50 I/O tokens and has been allocated 50 I/O tokens, allowing a total of 50 I/O requests. Assume further that each I/O request requires 2 Mbytes of data, making a total 100 Mbytes associated with the 50 I/O requests. Assume further that the client application has been allocated 20 throughput tokens, wherein each throughput token allows 1 Mbyte of data, making a total of 20 Mbytes of allowed data for the I/O requests. In this situation, while the client application is allowed 50 I/O requests, the client application would only issue 10 I/O requests (a total of 20 Mbytes) so as to not exceed the allowed number of throughput tokens currently allocated to the given client application in the current application. Once the client application receives I/O response messages indicating the completion of inflight I/O requests, the client application can send additional I/O requests but limited so that the total amount of data of inflight I/O requests does not exceed the maximum amount of inflight data as specified by the currently allocated 20 throughput tokens.

As noted above, the device group token allocation module 216 implements methods that are configured to allocate a set of device group tokens to each device group associated with the storage resources managed by the SDS control system 200. In some embodiments, the load that is allowed on a given device group is based on a budget of resource tokens that is derived from a measure of the ability of the given device group to perform concurrent I/O operations. For example, in some embodiments, a budget calculation for a given device group comprises estimating a performance value of the device type of the devices within the device group, and then multiplying the performance value by the number of devices within the device group. These device group-derived resource tokens can be scaled such that the sum of all resource tokens (e.g., total I/O tokens, total throughput tokens) from all device groups is less than or equal to the total number of available units of the resources that are to be protected from exhaustion.

In some embodiments, to preserve a limitation on the total number of resource tokens for a given resource of the system (e.g., I/O tokens for I/O-related resources, throughput tokens for storage-related resources) being less than the total capacity of a given resource, the following computations (e.g., EQNs. (3) and (4)) are performed by the device group token allocation module 216 to dynamically allocate resource-derived tokens between the different logical device groups of the physical data storage resources.

$$\text{Total Group } I/O \text{ Tokens}_{group_x} = \min(A, B) \qquad \text{EQN. (3)}$$

$$\text{wherein } A = \text{Max Group } I/O \text{ Token}_{group_x}$$

$$\text{wherein } B = \frac{\sum_{i=1}^{C} \text{Requested } I/O \text{ Tokens}_{client_i \to group_x}}{\sum_{j=1}^{G} \sum_{i=1}^{C} \text{Requested } I/O \text{ Tokens}_{client_i \to group_j}} \times$$

$$\text{Total } I/O \text{ Resource Tokens.}$$

-continued $$\text{Total Group } TP \text{ Tokens}_{group_x} = \min(Y, Z) \quad \text{EQN. (4)}$$

wherein $Y$ = Max Group $TP$ Tokens$_{group_x}$ $$\text{wherein } Z = \frac{\sum_{i=1}^{C} \text{Requested } TP \text{ Tokens}_{client_i \rightarrow group_x}}{\sum_{j=1}^{G} \sum_{i=1}^{C} \text{Requested } TP \text{ Tokens}_{client_i \rightarrow group_j}} \times$$

Total $I/O$ Resource Tokens.

As shown in EQN. (3), the total number of group I/O tokens that are allocated to a given device group (group$_x$) is determined as the minimum value of parameters A and B. The parameter A, Max Group I/O Tokens$_{group_x}$, comprises a predetermined value which represents the maximum number of concurrent I/O operations the given device group (group$_x$) can perform based on device type (e.g., speed) and number of devices within the given device group. The parameter B is computed as a proportion (e.g., ratio) of (i) the sum total number of all I/O tokens requested by all client applications (client$_i$, where i=1, . . . , C) having I/O requests directed to the given device group (group$_x$) to (ii) the sum total of all I/O tokens requested by all client applications having I/O requests directed to all the device groups (group$_j$, where j=1, . . . , G) of the storage devices, multiplied by a predefined total number of I/O resource tokens (denoted by Total I/O Resource Tokens) available to the SDS control system for processing I/O requests directed to the device groups managed by the SDS control system. The parameter Total I/O Resource Tokens represents a total number of I/O tokens that are available to SDS control system for distribution to the device groups while protecting the available I/O-related resources from being exhausted.

Similarly, as shown in EQN. (4), the total number of group throughput (TP) tokens that are allocated to a given device group (group$_x$) is determined as the minimum value of parameters Y and Z. The parameter Y, Max Group TP Tokens$_{group_x}$, comprises a predetermined value which represents the maximum number of throughput tokens (e.g., maximum amount of data) that can be concurrently processed by a given device group (group$_x$) at a given time based on device type (e.g., speed) and number of devices within the given device group. The parameter Z is computed as a proportion (e.g., ratio) of (i) the sum total number of all throughput tokens requested by all client applications (client$_i$, where i=1, . . . , C) having I/O requests directed to the given device group (group$_x$) to (ii) the sum total of all throughput tokens requested by all client applications having I/O requests directed to all the device groups (group$_1$, where j=1, . . . , G) of the storage devices, multiplied by a predefined total number of throughput resource tokens (denoted by Total TP Resource Tokens) available to the SDS control system for processing I/O requests directed to the device groups managed by the SDS control system. The parameter Total TP Resource Tokens represents a total number of throughput tokens that are available to SDS control system for distribution to the device groups while protecting the available throughput storage-related resources from being exhausted.

Based on the computations of EQNs. (3) and (4), the device group token allocation module 216 will periodically reallocate and distribute the Total I/O Resource Tokens and the Total TP Resource Tokens among the various device groups of the data storage resources managed by the SDS control system 200 in a dynamic, changing fashion, such that device groups which have a greater load/need for I/O operations at some given time are allocated more I/O tokens and/or throughput tokens than other device groups which have a lesser load/need and request less I/O tokens and/or throughput tokens at the same given time. To reduce the compute time and contention associated with resource token distribution, the computations of EQNs. (3) and (4) are periodically performed for each resource allocation cycle (e.g., every 100 milliseconds) rather than in response to each I/O request or each I/O operation.

Furthermore, the above computations (EQNs. (3) and (4)) ensure that a given device group will not be allocated more I/O tokens or throughput tokens than the given device group can concurrently process at any given time. Since the I/O requests of the client applications are limited by the amount of I/O and throughput tokens that are distributed to the device groups of the data storage system, and since there are inherently less tokens available for slower device groups, the token-based resource allocation methods described herein ensure that there are always available resources for faster operating device groups. In addition, the token-based resource allocation methods discussed herein serve to optimize the workload on the storage system, as the resources (e.g., I/O-related resources and throughput storage-related resources) are dynamically allocated, and optimally utilized where needed to effect load balancing in the SDS environment. Moreover, on the client side, the token-based resource allocation methods ensure fair token distribution to the client applications while catering to the changing needs of the client applications.

In some embodiments, as noted above, the client rank determination module 218 is implemented to compute and continually update rank values for client applications, wherein the rank values are utilized to modify I/O token and throughput token distributions to the client applications under certain circumstances. For example, assume there is some fault in the communication between a client application and the SDS control system or backend data storage system which causes a certain percentage of the client's inflight I/O requests to be dropped. In this circumstance, the client application would experience an increasing load of accumulated I/O requests, which would in turn cause the client application to request increasing amounts of I/O and/or throughput tokens. The increased number of requested resource tokens can skew the computation of allowed resource tokens on the system side since the calculation of allowed resource tokens to one client application is relative to the requests of other client applications. In this regard, a disproportionally high amount of requested resource tokens by one client application can result in the starvation of other client applications. It should be noted that the above scenario is distinguished from a situation in which the client application experiences a momentary or sustained peak in load and can use all the resource tokens granted to it. In the above scenario, where the inflight I/O requests are dropped, the system may be greatly underutilized.

To address these issues, a naïve solution would be to identify a problematic client application by comparing the client's resource token request values (e.g., I/O token request value, throughput token request value) to the actual usage recorded by the system, and to reduce the number of resource tokens allocated to the client application on future resource allocation cycles. Since the computations of EQNs. (1) and (2) described above are relative, and since the goal is to protect the resource availability to other client applications, a more optimal technique would be to downsize the resource token request values of the problematic client application in some proportion to bring the resource token request values back to some order of magnitude of the actual ability of the client application to utilize the system.

Another issue that is considered is how to avoid creating a fluctuating behavior with the resource token adjustment process. For example, there can be situation where a client application which was identified as problematic in a given resource allocation cycle N and was given and an appropriate number of resource tokens, will appear well-behaved on a next resource allocation cycle N+1 since the client's downsized resource token request value and its actual performance are in agreement. In this instance, the client's resource token request values will again be taken into account in full on the next resource allocation cycle, thus creating a relatively large fluctuation in the resource token allocation to the given client between resource allocation cycles.

In some embodiments, this "fluctuation" issue is addressed by utilizing a dedicated multiplier per client application, referred to as client "Rank." The client Rank is initialized to a predefined maximum rank value K and has a minimum value of 1. For a given client application, the client Rank value is increased/decreased at the end of each resource allocation cycle based on a difference between the given client application's resource token request value and the actual number of inflight I/O requests of the given client application which have been received by the SDS control system 200. The current client Rank value for a given client application is utilized to adjust the resource token request value of the given client application according to the following formula:

$$\text{New Token Request Value} = \frac{\text{Current Client Rank}}{K} * \text{Received Token Request Value}. \quad \text{EQN. (5)}$$

As shown in EQN. (5), the received resource token request value (e.g., I/O token request value or throughput token request value) which is received from a given client application, can be reduced in proportion to a ratio of (i) the current client Rank value to (ii) the predefined maximum rank value K. The new resource token request value that is computed using EQN. (5) comprises an adjusted resource token request value that is utilized by the I/O token allocation module 212 to compute (via EQN. (1)) the number of allowed I/O tokens for the given client application and/or the throughput token allocation module 214 to compute (via EQN. (2)) the number of allowed throughput tokens for the given client application. The use of the client Rank value as a means to adjust the resource token request values of client applications ensures, on one hand, that a reduction in the disturbance of a problematic client application will occur while still allocating resource tokens to such client application, and while providing a gradual change in the resource token allocation to the problematic client application over several resource allocation cycles to prevent the above-noted fluctuation problem.

It is to be noted that in some embodiments, the computations of EQNs. (1), (2), (3), (4), and (5) are performed once per resource allocation cycle for each of the client applications and device groups. For example, with regard to the computations of EQNs. (1), (2), (3), and (4), at the beginning of a new resource allocation cycle, such computations are performed using the most recently received "resource token request values" in I/O requests from the client applications. The most recently "resource token request value" of a given client application can be (i) one that was just received from the client application in the new resource allocation cycle just before, or at the time, the computations are started, or (ii) the last resource token request value that was previously received from the client application in a previous resource allocation cycle.

In some embodiments, if the SDS control system 200 has not received an I/O request (with a "resource token request value") from a given client application in the current resource allocation cycle or one or more previous resource allocations cycles, the SDS control system 200 can consider the given client to be a "quiet" client and temporarily accord the given client application a "resource token request value"=0. This avoids using old or stale resource token request values of the "quiet" client when performing the updated resource token allocation computations of the new resource allocation cycle. In other embodiments, the SDS control system can be configured to maintain the resource token request values received from a given client application from N previous resource allocation cycles, determine an average value of such resource token request values, and use the average value to perform the resource token allocation computations of the new resource allocation cycle.

Figure 3:
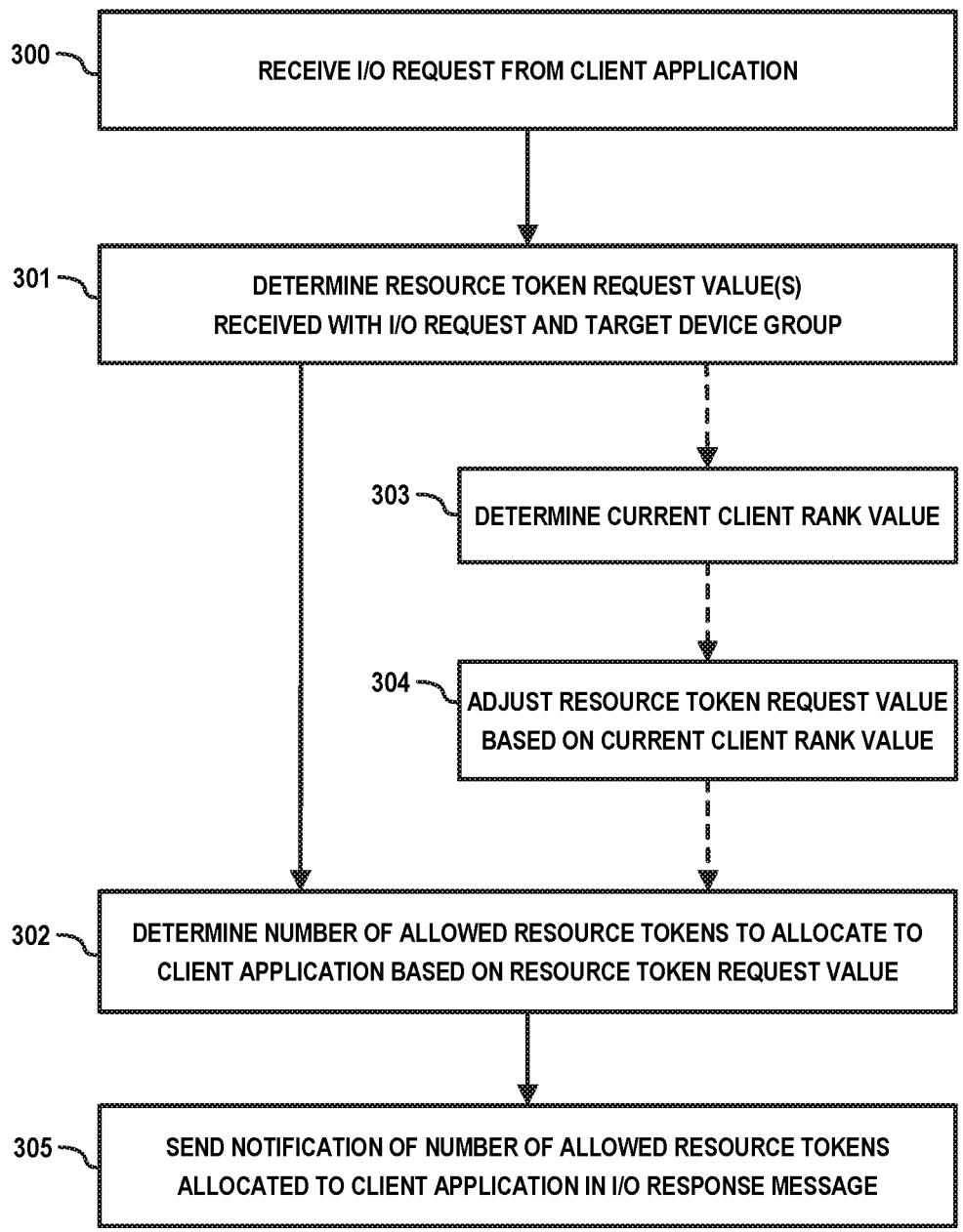
FIG. 3 is a flow diagram of a token-based resource allocation process for managing the sharing of resources among a plurality of clients in a software-defined storage environment, according to an exemplary embodiment of the disclosure.

FIG. 3 is a flow diagram of a token-based resource allocation process for managing the sharing of resources among a plurality of clients in a software-defined storage environment, according to an exemplary embodiment of the disclosure. For illustrative purposes, the method of FIG. 3 will be discussed in the context of the SDS control system 200 of FIG. 2. Referring to FIG. 3, the SDS control system 200 receives an I/O request from a client application (block 300). As noted above, the I/O request comprises information such as the target device group to which the I/O is destined and a resource token request value. In some embodiments, the resource token request value comprises at least one of an I/O token request value and a throughput token request value. The token-based resource allocation module 210 will determine (from the received I/O request) the resource token request value (e.g., I/O token request value or throughput token request value, or both) and the target device group (block 301).

In response to the received I/O request, the token-based resource allocation module 210 will determine a number of allowed resource tokens to allocate to the given client application based on the resource token request value included in the received I/O request (block 302). In particular, if the resource token allocation for the given client application has not yet been updated in the current resource allocation cycle, the token-based resource allocation module 210 will compute an updated number of allowed resource tokens to allocate to the given client application based on the resource token request value included in the received I/O request. For example, as noted above, in some embodiments, the I/O token allocation module 212 will utilize the computation of EQN. (1) to determine a number of allowed I/O tokens to allocate to the given client application for inflight I/O requests destined for the target device group based on the I/O token request value in the received I/O request. Further, the throughput token allocation module 214 will utilize the computation of EQN. (2) to determine a number of allowed throughput tokens to allocate to the given client application based on the throughput token request value in the received I/O request. On the other hand, if the resource token allocation (e.g., allowed I/O tokens, allowed throughput tokens) for the given client application has already been computed for the current resource allocation cycle, the I/O token allocation module 212 will not perform new token resource allocation computations, but rather simply access (from memory) the previously computed resource token allocation values for the given client application in the current resource allocation cycle.

In other embodiments, FIG. 3 illustrates an alternative process flow between blocks 301 and 302 (as indicated by the dashed arrows) which includes the client rank determination module 218 determining a current client rank value for the client application (block 303) and utilizing the computation of EQN. (5) to adjust the resource token request value in the received I/O request based on the current client rank value (block 304). As noted above, the resource token request value as actually requested by the client application can be proportionally reduced based on a ratio of the current client rank value to a predetermined maximum rank value. In this regard, the process of determining the number of allowed resource tokens to allocate to the client application (in block 302) is based on the adjusted resource token request value as determined by the client rank determination module 218, and not the actual resource token request value(s) as included in the I/O request received from the client application.

The SDS control system 200 will send a notification of the number of allowed resource tokens (e.g., I/O tokens and/or throughput tokens, etc.) that are allocated to the client application for the current resource allocation in a next I/O response message that is sent to the client application (block 305). In particular, as noted above, when the SDS control system sends an I/O response message to a client application, in addition to the standard information contained in the I/O response message, the I/O response message will further include the number of allowed resource tokens (e.g., I/O tokens and/or throughput tokens, etc.) that are allocated to the client application for the current resource allocation cycle. In this regard, the I/O response message may or may not be a direct response to the I/O request received from the client application (in block 300).

It is to be noted that once the resource token allocations for the client applications have been computed for the current resource allocation cycle, all I/O response messages returned by the SDS control system to each client application in the current resource allocation cycle will include the value of the allowed number of resource tokens allocated to that client application in the current resource allocation cycle, irrespective of the actual resource token request values that the SDS control system may receive from the client application in new I/O requests received from the client application in the current resource allocation cycle. As noted above, in some embodiments, the client application is responsible for sending I/O requests destined for the target device group in manner which does not exceed the number of inflight I/O requests and data limits specified by the number of allowed I/O tokens and throughput tokens currently allocated to the client application in the current resource allocation cycle.

Figure 4:
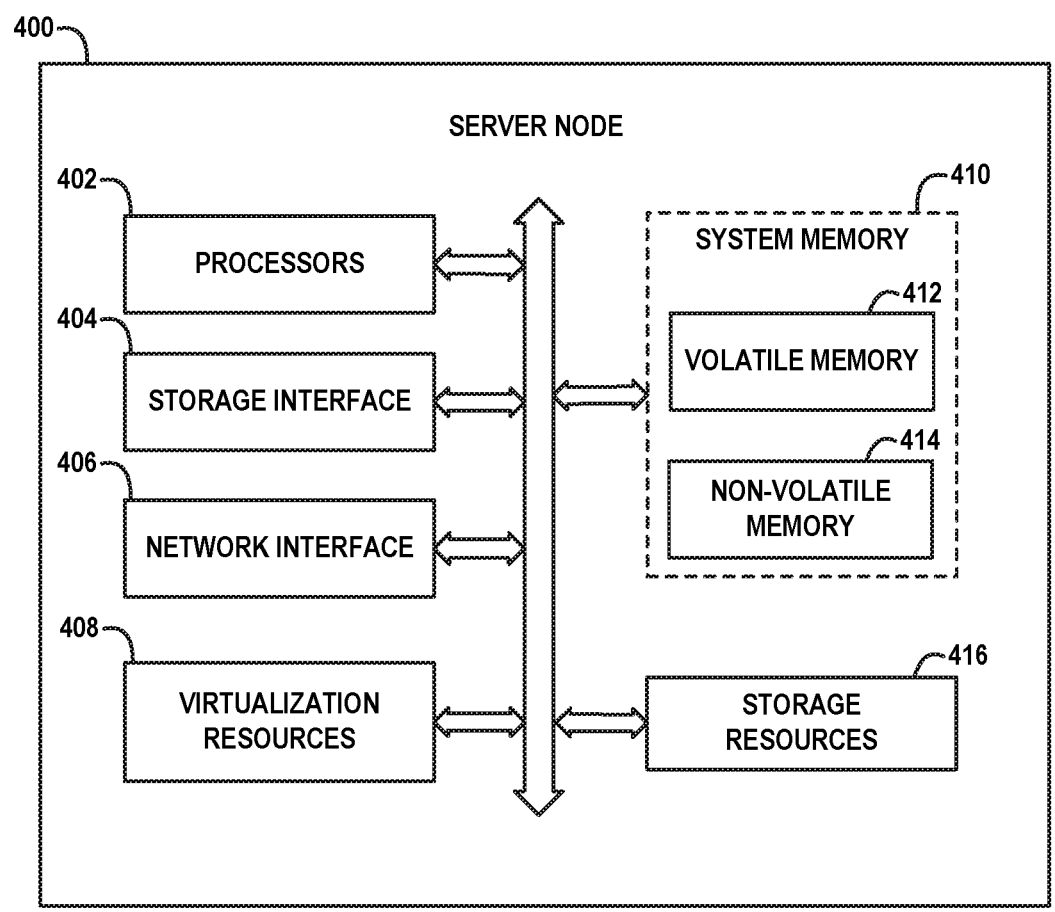
FIG. 4 schematically illustrates framework of a server node which can be implemented in the system of FIG. 1 for hosting a software-defined storage control system, according to an exemplary embodiment of the disclosure.

FIG. 4 schematically illustrates framework of a server node which can be implemented in the system of FIG. 1 for hosting a software-defined storage control system, according to an exemplary embodiment of the disclosure. In particular, FIG. 4 schematically illustrates an exemplary hardware architecture of the server node 130 of FIG. 1, which can host the SDS control system 140 of FIG. 1, or the SDS control system 200 of FIG. 2. The server node 400 comprises processors 402, storage interface circuitry 404, network interface circuitry 406, virtualization resources 408, system memory 410, and storage resources 416. The system memory 410 comprises volatile memory 412 and non-volatile memory 414.

The processors 402 comprise one or more types of hardware processors that are configured to process program instructions and data to execute a native operating system (OS) and applications that run on the server node 400. For example, the processors 402 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligent (AI) accelerators, and other types of specialized processors or coprocessors that are configured to execute one or more fixed functions.

The storage interface circuitry 404 enables the processors 402 to interface and communicate with the system memory 410, the storage resources 416, and other local storage and off-infrastructure storage media, using one or more standard communication and/or storage control protocols to read data from or write data to volatile and non-volatile memory/storage devices. Such protocols include, but are not limited to, non-volatile memory express (NVMe), peripheral component interconnect express (PCIe), Parallel ATA (PATA), Serial ATA (SATA), Serial Attached SCSI (SAS), Fibre Channel, etc. The network interface circuitry 406 enables the server node 400 to interface and communicate with a network and other system components. The network interface circuitry 406 comprises network controllers such as network cards and resources (e.g., network interface controllers (NICs) (e.g. SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc.

The virtualization resources 408 can be instantiated to execute one or more services or functions which are hosted by the server node 400. For example, the virtualization resources 408 can be configured to implement the various modules and functionalities of the SDS control systems 140 and 200 of FIGS. 1 and 2 as discussed herein. In one embodiment, the virtualization resources 408 comprise virtual machines that are implemented using a hypervisor platform which executes on the server node 400, wherein one or more virtual machines can be instantiated to execute functions of the server node 400. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine.

Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 400, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In another embodiment, the virtualization resources 408 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 400 as well as execute one or more of the various modules and functionalities of the SDS control systems 140 and 200 of FIGS. 1 and 2, as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

The various software modules of the SDS control systems and the token-based resource allocation modules shown in FIGS. 1 and 2 comprise program code that is loaded into the system memory 410 (e.g., volatile memory 412), and executed by the processors 402 to perform respective functions as described herein. In this regard, the system memory 410, the storage resources 416, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 410 comprises various types of memory such as volatile RAM, NVRAM, or other types of memory, in any combination. The volatile memory 412 may be a dynamic random-access memory (DRAM) (e.g., DRAM DIMM (Dual In-line Memory Module), or other forms of volatile RAM. The non-volatile memory 414 may comprise one or more of a NAND Flash storage device, an SSD device, or other types of next generation non-volatile memory (NGNVM) devices. The system memory 410 can be implemented using a hierarchical memory tier structure wherein the volatile system memory 412 is configured as the highest-level memory tier, and the non-volatile system memory 414 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 402 to execute a native operating system and one or more applications or processes hosted by the server node 400, and to temporarily store data that is utilized and/or generated by the native OS and application programs and processes running on the server node 400. The storage resources 416 can include one or more HDDs, SSD storage devices, etc.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. A method, comprising:

receiving, by a storage control system, an input/output (I/O) request from a client application for accessing data storage resources controlled by the storage control system, wherein the data storage resources comprise storage devices which are logically divided by the storage control system into a plurality of storage device groups, wherein each storage device group of the plurality of storage device groups is dynamically allocated a corresponding amount of resource tokens by the storage control system based at least in part on relative workload demands of the storage device groups;

determining, by the storage control system, a resource token request value associated with the I/O request and (ii) a target storage device group of the plurality of storage device groups to which the I/O request is directed;

determining, by the storage control system, a number of allowed resource tokens to allocate to the client application, wherein the number of allowed resource tokens is determined as a function of (i) the resource token request value, (ii) a sum total of resource tokens requested by other client applications for accessing the target storage device group, and (iii) a total amount of resource tokens currently allocated to the target storage device group to which the I/O request is directed; and sending to the client application, by the storage control system, the determined number of allowed resource tokens allocated to the client application to thereby enable the client application to limit a number of inflight I/O requests that the client application issues to the storage control system based on the number of allowed resource tokens allocated to the client application for accessing the target storage device group.

2. The method of claim 1, wherein the number of allowed resource tokens allocated to the client application comprises a number of allowed I/O tokens, wherein the number of allowed I/O tokens is configured to limit an amount of I/O-related resources that are utilized to process I/O requests of the client application which are directed to the target storage device group.

3. The method of claim 1, wherein the number of allowed resource tokens allocated to the client application comprises a number of allowed throughput tokens, wherein the number of allowed throughput tokens is configured to limit an amount of storage-related resources that are utilized to process I/O requests of the client application which are directed to the target storage device group.

4. The method of claim 3, wherein one throughput token represents a predefined amount of data.

5. The method of claim 1, wherein:
the resource token request value associated with the I/O request comprises an I/O token request value, wherein the I/O token request value represents a total amount of (i) current inflight I/O requests and (ii) accumulated I/O inflight requests of the client application which have not yet been sent; and
the number of allowed resource tokens allocated to the client application comprises a number of allowed I/O tokens, wherein the number of allowed I/O tokens represents a total number of inflight I/O requests the given client application can concurrently have in a next resource allocation cycle, wherein the total number of inflight requests comprises a total amount of (i) new inflight I/O requests that client application can send in the next resource allocation cycle and (ii) currently pending inflight I/O requests.

6. The method of claim 1, wherein:
the resource token request value associated with the I/O request comprises a throughput token request value, wherein the throughput token request value represents a total amount of data associated with all inflight I/O requests of the client application; and
the number of allowed resource tokens allocated to the client application comprises a number of allowed throughput tokens, wherein the number of allowed throughput tokens represents a maximum amount of data that can be associated with all concurrent inflight I/O requests that are allocated to the given client application for a next resource allocation cycle.

7. The method of claim 1, further comprising:
determining, by the storage control system, a current rank value of the client application;
adjusting, by the storage control system, the resource token request value associated with the I/O request of the client application based on the determined current rank value of the client application; and
determining, by the storage control system, the number of allowed resource tokens to allocate to the client application based on the adjusted resource token request value.

8. The method of claim 7, wherein adjusting the resource token request value comprises reducing the resource token request value in proportion to a ratio of (i) the determined current rank value to (ii) a predefined maximum rank value.

9. The method of claim 1, wherein the plurality of storage device groups comprises at least a first storage device group comprising storage devices of a first device type, and a second storage device group comprising storage devices of a second device type, which is different from the first device type; and wherein the method further comprises:
determining, by the storage control system, a respective maximum storage device group token value for each storage device group of the plurality of storage device groups, wherein the maximum storage device group token value for a given storage device group represents a maximum number of resource tokens that are allocated to the given storage device group, out of a total amount of available resource tokens of the data storage system, based on a maximum amount of concurrent I/O operations that the given storage device group can perform based on the type of storage devices of the given storage device group and a number of storage devices within the given storage device group.

10. An article of manufacture comprising a non-transitory processor-readable storage medium having stored therein program code of one or more software programs, wherein the program code is executable by one or more processors to implement a method comprising:
receiving, by a storage control system, an input/output (I/O) request from a client application for accessing data storage resources controlled by the storage control system, wherein the data storage resources comprise storage devices which are logically divided by the storage control system into a plurality of storage device groups, wherein each storage device group of the plurality of storage device groups is dynamically allocated a corresponding amount of resource tokens by the storage control system based at least in part on relative workload demands of the storage device groups;
determining, by the storage control system, a resource token request value associated with the I/O request and (ii) a target storage device group of the plurality of storage device groups to which the I/O request is directed;
determining, by the storage control system, a number of allowed resource tokens to allocate to the client application, wherein the number of allowed resource tokens is determined as a function of (i) the resource token request value, (ii) a sum total of resource tokens requested by other client applications for accessing the target storage device group, and (iii) a total amount of resource tokens currently allocated to the target storage device group to which the I/O request is directed; and
sending to the client application, by the storage control system, the determined number of allowed resource tokens allocated to the client application to thereby enable the client application to limit a number of inflight I/O requests that the client application issues to the storage control system based on the number of allowed resource tokens allocated to the client application for accessing the target storage device group.

11. The article of manufacture of claim 10, wherein the number of allowed resource tokens allocated to the client application comprises a number of allowed I/O tokens, wherein the number of allowed I/O tokens is configured to limit an amount of I/O-related resources that are utilized to process I/O requests of the client application which are directed to the target storage device group.

12. The article of manufacture of claim 10, wherein the number of allowed resource tokens allocated to the client application comprises a number of allowed throughput tokens, wherein the number of allowed throughput tokens is configured to limit an amount of storage-related resources that are utilized to process I/O requests of the client application which are directed to the target storage device group, wherein one throughput token represents a predefined amount of data.

13. The article of manufacture of claim 10, wherein:
the resource token request value associated with the I/O request comprises an I/O token request value, wherein the I/O token request value represents a total amount of (i) current inflight I/O requests and (ii) accumulated I/O inflight requests of the client application which have not yet been sent; and
the number of allowed resource tokens allocated to the client application comprises a number of allowed I/O tokens, wherein the number of allowed I/O tokens represents a total number of inflight I/O requests the given client application can concurrently have in a next resource allocation cycle, wherein the total number of inflight requests comprises a total amount of (i) new inflight I/O requests that client application can send in the next resource allocation cycle and (ii) currently pending inflight I/O requests.

14. The article of manufacture of claim 10, wherein:
the resource token request value associated with the I/O request comprises a throughput token request value, wherein the throughput token request value represents a total amount of data associated with all inflight I/O requests of the client application; and
the number of allowed resource tokens allocated to the client application comprises a number of allowed throughput tokens, wherein the number of allowed throughput tokens represents a maximum amount of data that can be associated with all concurrent inflight I/O requests that are allocated to the given client application for a next resource allocation cycle.

15. The article of manufacture of claim 10, further comprising:
determining, by the storage control system, a current rank value of the client application;
adjusting, by the storage control system, the resource token request value associated with the I/O request of the client application based on the determined current rank value of the client application, wherein adjusting the resource token request value comprises reducing the resource token request value in proportion to a ratio of (i) the determined current rank value to (ii) a predefined maximum rank value; and
determining, by the storage control system, the number of allowed resource tokens to allocate to the client application based on the adjusted resource token request value.

16. The article of manufacture of claim 10, wherein the plurality of storage device groups comprises at least a first storage device group comprising storage devices of a first device type, and a second storage device group comprising storage devices of a second device type, which is different from the first device type; and wherein the method further comprises:
determining, by the storage control system, a respective maximum storage device group token value for each storage device group of the plurality of storage device groups, wherein the maximum storage device group token value for a given storage device group represents a maximum number of resource tokens that are allocated to the given storage device group, out of a total amount of available resource tokens of the data storage system, based on a maximum amount of concurrent I/O operations that the given storage device group can perform based on the type of storage devices of the given storage device group and a number of storage devices within the given storage device group.

17. A server node, comprising:
at least one processor; and
system memory configured to store program code, wherein the program code is executable by the at least one processor to implement a storage control system which is configured to:
receive an input/output (I/O) request from a client application for accessing data storage resources controlled by the storage control system, wherein the data storage resources comprise storage devices which are logically divided by the storage control system into a plurality of storage device groups, wherein each storage device group of the plurality of storage device groups is dynamically allocated a corresponding amount of resource tokens by the storage control system based at least in part on relative workload demands of the storage device groups;
determine (i) a resource token request value associated with the I/O request and (ii) a target storage device group of the plurality of storage device groups to which the I/O request is directed;
determine a number of allowed resource tokens to allocate to the client application, wherein the number of allowed resource tokens is determined as a function of (i) the resource token request value, (ii) a sum total of resource tokens requested by other client applications for accessing the target storage device group, and (iii) a total amount of resource tokens currently allocated to the target storage device group to which the I/O request is directed; and
send to the client application, the determined number of allowed resource tokens allocated to the client application to thereby enable the client application to limit a number of inflight I/O requests that the client application issues to the storage control system based on the number of allowed resource tokens allocated to the client application for accessing the target storage device group.

18. The server node of claim 17, wherein the number of allowed resource tokens allocated to the client application comprises a number of allowed I/O tokens, wherein the number of allowed I/O tokens is configured to limit an amount of I/O-related resources that are utilized to process I/O requests of the client application which are directed to the target storage device group.

19. The server node of claim 17, wherein the number of allowed resource tokens allocated to the client application comprises a number of allowed throughput tokens, wherein the number of allowed throughput tokens is configured to limit an amount of storage-related resources that are utilized to process I/O requests of the client application which are directed to the target storage device group.

20. The server node of claim 17, wherein the storage control system comprises a software-defined storage control system.

* * * * *

UNITED STATES PATENT AND TRADEMARK OFFICE
CERTIFICATE OF CORRECTION

PATENT NO. : 11,221,975 B2  
APPLICATION NO. : 16/807709  
DATED : January 11, 2022  
INVENTOR(S) : Avi Puder et al.

Page 1 of 1

It is certified that error appears in the above-identified patent and that said Letters Patent is hereby corrected as shown below:

In the Claims

Claim 1, Column 20, Line 48, after "by the storage control system," insert -- (i) --

Claim 10, Column 22, Line 33, after "by the storage control system," insert -- (i) --

Signed and Sealed this  
Eighth Day of February, 2022

Drew Hirshfeld  
*Performing the Functions and Duties of the*  
*Under Secretary of Commerce for Intellectual Property and*  
*Director of the United States Patent and Trademark Office*